United States Patent [19]
Crowell et al.

[11] Patent Number: 5,859,482
[45] Date of Patent: Jan. 12, 1999

[54] LIQUID COOLED ELECTRIC MOTOR FRAME

[75] Inventors: James R. Crowell, Huntertown; Matthew M. Doctor, Huntington, both of Ind.; Walter R. Johnson, Humacao, Puerto Rico; Timothy K. Marker, Fort Wayne, Ind.; Darrell R. Sontag, Santa Fe, N. Mex.; Ajoy K. Basu, Fort Wayne, Ind.

[73] Assignee: General Electric Company, Schenectady, N.Y.

[21] Appl. No.: 801,095

[22] Filed: Feb. 14, 1997

[51] Int. Cl.⁶ .............................. H02K 5/06; H02K 9/10
[52] U.S. Cl. .................................. 310/58; 310/54
[58] Field of Search .................. 310/42, 52, 54, 310/58, 59, 60 R, 60 A, 64

[56] References Cited

U.S. PATENT DOCUMENTS

| | | | |
|---|---|---|---|
| 3,009,072 | 11/1961 | Mossay | 310/57 |
| 3,127,530 | 3/1964 | White | 310/54 |
| 3,479,541 | 11/1969 | Robinson | 310/54 |
| 3,504,207 | 3/1970 | Tjernstrom | 310/54 |
| 3,535,565 | 10/1970 | Lang | 310/54 |
| 3,544,820 | 12/1970 | Wightman | 310/42 |
| 3,622,820 | 11/1971 | Tjernstrom | 310/54 |
| 3,740,595 | 6/1973 | Heller et al. | 310/54 |
| 3,789,249 | 1/1974 | Purman | 310/54 |
| 3,818,256 | 6/1974 | Ying et al. | 310/59 |
| 3,868,520 | 2/1975 | Curtis et al. | 310/61 |
| 3,968,389 | 7/1976 | Albaric et al. | 310/61 |
| 4,039,870 | 8/1977 | Sterrett | 310/52 |
| 4,114,058 | 9/1978 | Albaric | 310/54 |
| 4,114,059 | 9/1978 | Albaric | 310/54 |
| 4,210,834 | 7/1980 | Weghaupt et al. | 310/61 |
| 4,644,210 | 2/1987 | Meisner et al. | 310/211 |
| 4,728,840 | 3/1988 | Newhouse | 310/113 |
| 4,751,412 | 6/1988 | Lowther et al. | 310/52 |
| 4,766,557 | 8/1988 | Twerdochlib | 364/550 |
| 4,870,307 | 9/1989 | Kitamura et al. | 310/54 |
| 4,877,985 | 10/1989 | Byrd et al. | 310/86 |
| 4,920,663 | 5/1990 | Flemming | 36/73 |
| 4,922,148 | 5/1990 | Kitamura et al. | 310/68 D |
| 4,980,588 | 12/1990 | Ogawa | 370/68 D |
| 5,055,729 | 10/1991 | Fogarty et al. | 310/214 |
| 5,074,672 | 12/1991 | Emery et al. | 374/147 |
| 5,103,552 | 4/1992 | Fogarty et al. | 29/596 |
| 5,113,103 | 5/1992 | Blum et al. | 310/89 |
| 5,285,563 | 2/1994 | Nove et al. | 29/596 |
| 5,293,089 | 3/1994 | Frister | 310/54 |

(List continued on next page.)

FOREIGN PATENT DOCUMENTS

| | | |
|---|---|---|
| 589187A1 | 3/1994 | European Pat. Off. . |
| 1.571.890 | 6/1969 | France . |
| 1571890 | 6/1969 | France . |
| 15.812 | 4/1995 | France . |
| 9107197.6 | 10/1992 | Germany . |
| 06315246 | 11/1994 | Japan . |
| 07111759 | 4/1995 | Japan . |

*Primary Examiner*—Clayton E. LaBalle
*Assistant Examiner*—Judson H. Jones
*Attorney, Agent, or Firm*—Armstrong, Teasdale, Schlafly & Davis

[57] ABSTRACT

Liquid cooled electric motors including stator frames having cast in place cooling conduits are described. In an exemplary embodiment, the conduit is arranged in a generally helical configuration and the stator frame is cast around the conduit so that the conduit is embedded within, and integral with, the frame. Spacer, or stabilizer, bars are engaged to the conduit and provide support for the conduit and facilitate maintaining the desired spacing between lengths of conduit and between the conduit and the frame wall. The stator frame with the cast in place cooling conduit has the advantages of a liquid cooled motor yet is believed to be lower cost than known liquid cooled motors. The frame also is believed to be less susceptible to corrosion and liquid leaks as compared to known liquid cooled motors. Further, the advantage that the cooling coil and frame material may be different is provided, which enables selection of optimum material for the coil and frame with respect to cost, corrosion resistance, mechanical strength, and machinability.

31 Claims, 3 Drawing Sheets

U.S. PATENT DOCUMENTS

| | | | |
|---|---|---|---|
| 5,333,680 | 8/1994 | Sinhuber | 165/47 |
| 5,448,118 | 9/1995 | Nakamura et al. | 310/54 |
| 5,473,207 | 12/1995 | Hopeck et al. | 310/65 |
| 5,523,640 | 6/1996 | Sparer et al. | 310/64 |
| 5,620,646 | 4/1997 | Sparer et al. | 310/54 X |
| 5,623,175 | 4/1997 | Ronning et al. | 310/54 |
| 5,696,415 | 12/1997 | Fujimoto et al. | 310/89 |

LIQUID COOLED ELECTRIC MOTOR FRAME

FIELD OF THE INVENTION

This invention relates generally to electric motors and, more particularly, to a liquid cooled electric motor frame including a cast in place cooling conduit and methods for fabricating such a motor frame.

BACKGROUND OF THE INVENTION

Electric motors generate heat during operation as a result of both electrical and mechanical losses, and an electric motor typically must be cooled in order to ensure the desired and efficient operation of the motor. An excessively high motor temperature may result in motor bearing failure or damage to the stator winding insulation.

Electric motors generally have an enclosure, or housing, including a frame and endshields. The most common enclosures are "open" or totally enclosed. With an "open" enclosure, ambient air circulates within the enclosure, and heat is removed by convection between the air and heat generating motor components within the enclosure. The air is exhausted out from the enclosure.

Totally enclosed type enclosures typically are used in applications in which airborne contaminants, e.g., dirt, oil, or mist, must be prevented from entering within the enclosure. Both convection and conduction type cooling occurs within the enclosure, and some form of convection cooling occurs at the external surfaces of the enclosure. For example, forced convection cooling is provided by a fan mounted to the motor shaft external the enclosure. The fan forces air over the frame and endshields. Alternatively, free convection and radiation type cooling may occur if no shaft mounted fan is provided.

Known open and totally enclosed fan cooled motors generally require a fan or compressor for circulating air over or through the motor. Providing the required air volume and velocity for proper cooling often results in significant fan noise. Such noise can be reduced by eliminating the fan. Eliminating the fan, however, results in a significant reduction in the cooling since the cooling coefficients associated with free convection and radiation type cooling are significantly lower than the cooling coefficients associated with forced convection cooling. Due to the lower cooling coefficients, a motor utilizing free convection and radiation type cooling must physically be larger than a forced air cooled motor, or the motor power output must be reduced as compared to the power output of the forced air cooled motor.

With the above described enclosures and cooling, heat from the motor is exchanged with ambient air in the immediate vicinity of the motor. In many applications, the heated ambient air must be continually refreshed with cooler air in order to maintain proper motor cooling.

In a totally enclosed liquid cooled motor, the motor is connected to a coolant supply. The coolant supply is connected in a cooling circuit, which can be a closed loop or open loop type circuit. The liquid coolant could, for example, be water, hydraulic oil, or other relatively low temperature process liquids.

In a closed loop system, the coolant is pumped through the motor and removes the generated heat. The coolant is then circulated through a remotely mounted heat exchanger and returned to the motor. As one example, in a closed loop system the motor is connected to a cooling circuit including a motor cooling coil, a circulating pump, an external evaporative chiller, and associated piping.

In an open loop system, the coolant is not returned to the motor as in the closed loop system. The coolant could, for example, be waste liquids, process liquids, or any other available source of liquid that functions as a coolant. As one example, in an open loop system, the motor is connected to a motor driven pump which pumps liquid from a large reservoir, and a small percentage of the high-pressure fluid exiting the pump is diverted through the motor cooling coil and returned to the reservoir.

The heat transfer coefficient for forced convection cooling using liquid is generally much higher, or better, than the heat transfer coefficient for air. Therefore, in a liquid cooled motor, the overall cooling typically is much better than a similarly sized, substantially similar air cooled motor. Further, in a liquid cooled motor, and by using a remotely mounted heat exchanger such as an evaporative water chiller, the immediate surroundings of the motor are not heated as with an air cooled motor. The remotely mounted heat exchanger therefore further facilitates improving motor operation. Also, in a liquid cooled motor, the external fan can be eliminated which facilitates reducing motor noise.

In one known totally enclosed water cooled motor configuration, the stator frame includes a cooling jacket or passage, and a cooling medium from an external source flows through the jacket and removes heat generated by the motor. Particularly, in known liquid cooled motors, the cooling jacket is formed by an inner shell and an outer shell. The inner shell is machined to form a water path through the shell, and the outer shell is then press fit or welded to the inner shell to form the water jacket. Significant machining, welding, and assembly time are required to fabricate the above described water jacket. In addition, leak checking and rework typically are required and further increase the frame cost.

The improved overall heat transfer of liquid cooling enables operation of the motor at a higher output for a particular motor size as compared to an air cooled motor of the same size. Therefore, totally enclosed liquid cooled motors may be smaller than totally enclosed air cooled motors having the same horse power ratings, even taking into account the water jacket. The size of the motor affects, of course, the cost of motor components.

Also, known totally enclosed air cooled motors are believed to be noisier than liquid cooled motors since the liquid dampens at least some of the noise resulting from motor operation. The totally enclosed air cooled motor with an external fan generates significant noise due to air velocity and turbulence. For example, an air cooled motor may operate at approximately about 70–80 dBA, and a similarly rated liquid cooled motor may operate at approximately about 50 dBA.

Although liquid cooled motors are believed to provide many advantages, such motors also have disadvantages. For example, such motors typically are more expensive to fabricate than air cooled motors, and liquid cooled motors are susceptible to corrosion and to liquid leaks. Further, as corrosion builds-up within the cooling jacket over time, the overall heat transfer capability of the water cooled motor degrades.

It would be desirable to provide the many advantages of a liquid cooled motor yet at a lower cost than known liquid cooled motors. It also would be desirable to provide a liquid cooled motor that has a reduced susceptibility to corrosion and liquid leaks as compared to known liquid cooled motors.

An object of the present invention is to provide a low cost liquid cooled motor.

Another object of the present invention is to provide such a liquid cooled motor which is less susceptible to corrosion and liquid leaks than known liquid cooled motors.

Still another object of the invention is to provide a simplified and lower cost process for fabricating liquid cooled motors.

Yet another object of the present invention is to provide an integral cooling jacket and stator frame for reducing the labor required in fabricating a liquid cooled motor as compared to the labor required in known liquid cooled motors.

SUMMARY OF THE INVENTION

These and other objects may be attained with a liquid cooled electric motor including a stator frame having a cast in place cooling conduit. In an exemplary embodiment, the conduit is arranged in a generally helical geometric configuration and the stator frame is cast around the conduit so that the conduit is embedded within, and integral with, the frame. Spacer, or stabilizer, bars are engaged to the conduit and provide support for the conduit and facilitate maintaining the desired spacing between lengths of the conduit. The spacer bars also facilitate centering the coil in the cast frame wall and locate, or orient, the cooling coil axially within the frame during the casting process. In addition, the spacer bars facilitate determining the concentricity of the cooling coil with respect to the stator frame bore prior to the stator frame machining process, which reduces the possibility of damaging the cooling coil during such machining. The stator frame also includes a cooling inlet port and a cooling outlet port in flow communication with the cast in place cooling conduit.

Of course, many alternative configurations for the cooling conduit are possible and contemplated. For example, the cooling conduit described above provides that the cooling medium flows around, or circumferentially, with respect to the motor stator. Alternatively, and by way of example, the cooling conduit could be configured so that the cooling medium flows substantially axially with respect to the motor stator. Various alternative configurations of cooling conduits are described herein.

Prior to operation of a motor including the above described stator frame having the cast in place cooling conduit, the frame inlet and outlet ports are coupled in a closed loop cooling circuit which includes, for example, a pump and a remote heat exchanger. In operation, a cooling medium such as water flows through the cooling circuit. Particularly, to cool the motor during operation, the cooling medium is delivered to the inlet port and flows through the conduit to the outlet port. As the cooling medium flows through the conduit, heat generated by the motor is transferred to the cooling medium through the conduit. The heated cooling medium then flows out of the frame through the outlet port, and the heated cooling medium is then pumped by the cooling circuit pump. The cooling medium is circulated through a remote heat exchanger so that the cooling medium is cooled and then delivered to the inlet port.

The cast in cooling coil can be fabricated from a metal different from the metal used in casting the frame. For example, the casting material may be gray iron and the coil may be stainless steel to take advantage of the mechanical dampening characteristics of the gray iron and the corrosion resistance of the stainless steel. Alternatively, the casting material may be aluminum alloy which is easy to machine and has a high thermal conductivity. In known enclosures for water cooled motors, in order to provide the corrosion resistance of stainless steel, the entire frame generally must be cast from stainless steel, which is expensive. In the above described cast in coil construction, the coil can be stainless steel and the casting material can be a lower cost and easier to machine material.

The above described motor including the stator frame with the cast in place cooling conduit has the advantages of a liquid cooled motor yet is believed to be lower cost than known liquid cooled motors. Such lower cost is achieved by providing that the preformed cooling conduit is simply cast in place rather than requiring the significant machining, welding, and assembly time associated with known water jackets. The motor also is believed to be less susceptible to corrosion and liquid leaks as compared to known liquid cooled motors. Specifically, since the corrosion resistant, continuous, and sealed cooling conduit is cast in place in the stator frame, the possibility for leaks and internal coil or external frame corrosion are believed to be reduced as compared the possibility for leaks and corrosion which may result with known water jackets.

DETAILED DESCRIPTION

Figure 1:
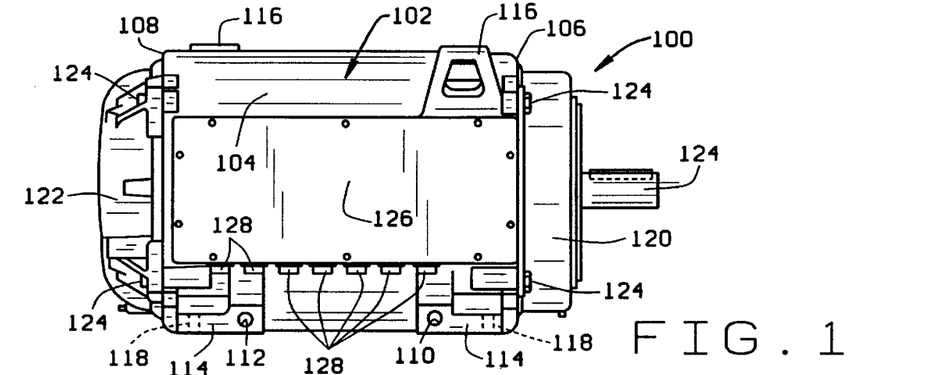
FIG. 1 is a side elevation view of a motor.

FIG. 1 is a side elevation view of a liquid cooled electric motor 100 including a stator frame 102 having a cast in place cooling conduit (not shown in FIG. 1), as described hereinafter in more detail. The cast in place cooling conduit defines a cooling passageway, or path, through frame 102. By casting the cooling conduit in stator frame 102, it is believed that the many advantages of liquid cooling can be provided at a lower cost than known liquid cooled motors. Further, the cast in place cooling conduit structure results in stator frame 102 and the cooling passage having reduced susceptibility to corrosion and liquid leaks as compared to stator frames and cooling passages of known liquid cooled motors.

Figure 2:
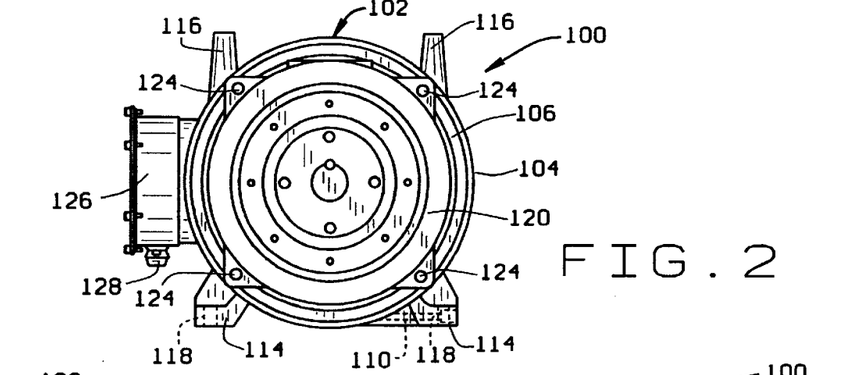
FIG. 2 is a front elevation view of the motor shown in FIG. 1.

More particularly, and referring to FIGS. 1 and 2, stator frame 102 includes a substantially cylindrical shaped body section 104 having opposed ends 106 and 108. A cooling inlet port 110 and a cooling outlet port 112 are in flow communication with the cast in place cooling conduit (not shown in FIGS. 1 and 2). Frame 102 also includes support feet 114 and lifting lugs or eye bolts 116. Bolt openings 118 are provided in support feet 114 so that motor 100 can be bolted, if desired, in place. End shields 120 and 122 are secured to frame 102 by bolts 124 and close ends 106 and 108 of frame 102. Assembled end shields 120 and 122 and frame 102 sometimes are referred to as the enclosure or motor housing.

A stator core and windings (not shown) are secured within the motor housing, as is well known. A rotor shaft 124 is rotatably mounted within the housing and rotates relative to frame 102. A conduit box 126 is secured to stator frame 102, and conduit box 126 includes lead cable strain reliefs 128 positioned adjacent openings in conduit box 126. Power and control leads (not shown) extend through the openings in conduit box 126 and are electrically connected, for example, to the stator windings.

Figure 3:
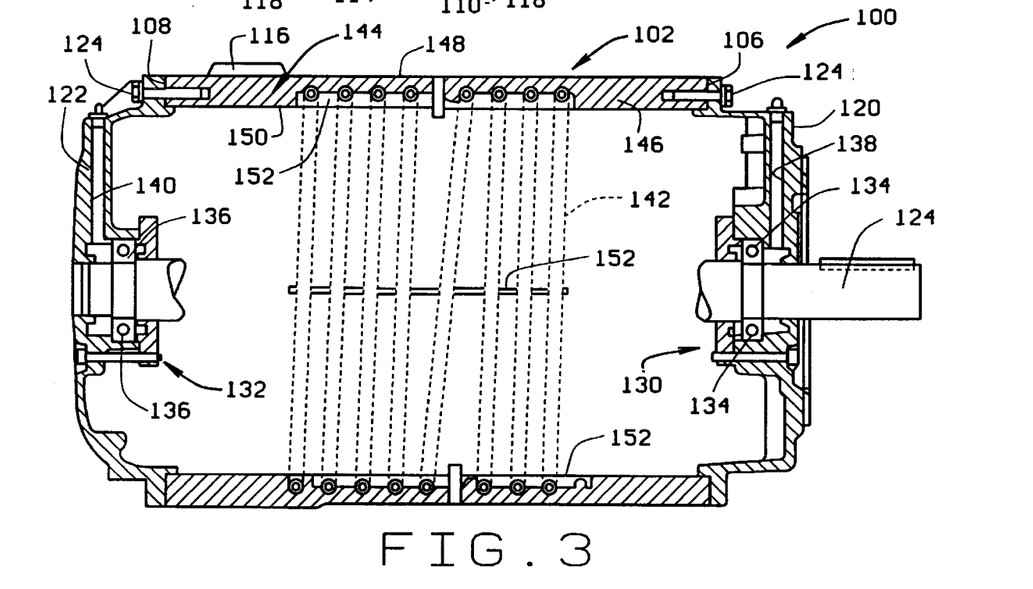
FIG. 3 is partial cross-section view through the motor shown in FIG. 1.

FIG. 3 is a partial cross-section view through motor 100. As shown in FIG. 3, bearing assemblies 130 and 132 are supported by end shields 120 and 122, and bearing assemblies 130 and 132 include bearings 134 and 136 for supporting rotor shaft 124. Grease inlet tubes 138 and 140 in flow communication with bearing assemblies 130 and 132 extend through end shields 120 and 122 and enable an operator to supply grease to bearings 134 and 136.

Still referring to FIG. 3, cooling conduit 142 is located in stator frame 102. Frame 102 includes a substantially cylindrical shaped body section 144 formed by a wall 146 having an outer surface 148 and an inner surface 150. The cooling passageway is at least partially within wall 146 between inner and outer surfaces 148 and 150. Particularly, conduit 142 (sometimes referred to as a tube coil) has a generally helical geometric shape and extends along a length of frame 102. Spacer, or stabilizer, bars 152 are engaged to conduit 142.

Figure 4:
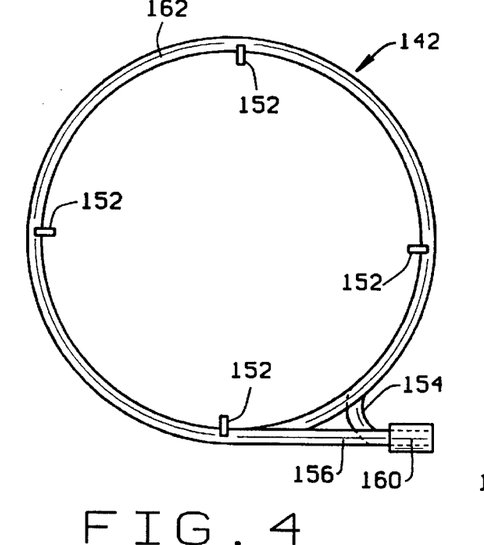
FIG. 4 is a front view of the cooling conduit utilized in connection with the motor shown in FIG. 1.
Figure 5:
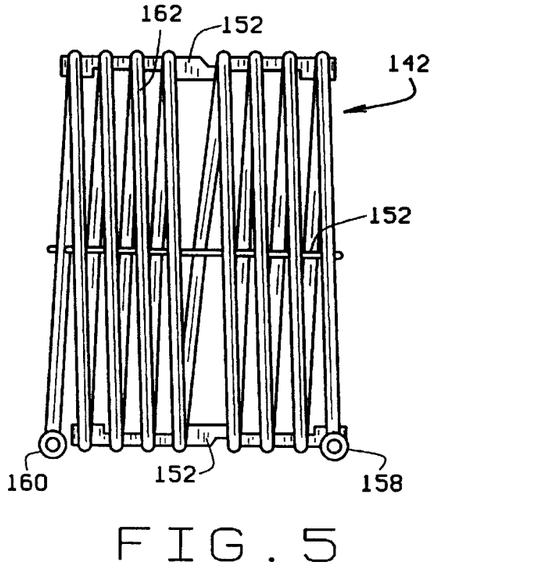
FIG. 5 is a side elevation view of the conduit shown in FIG. 4.
Figures 6, 7:
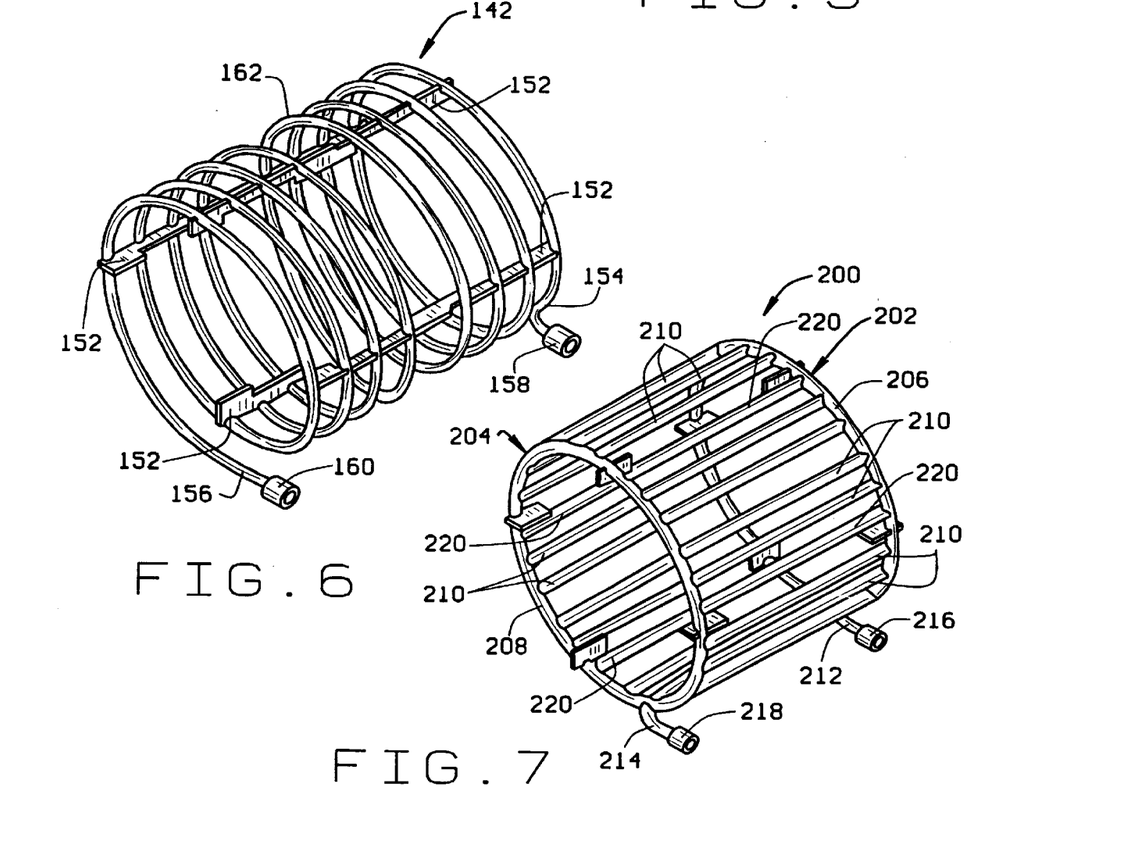
FIG. 6 is a perspective view of the conduit shown in FIG. 4.
FIG. 7 is a perspective view of an alternative embodiment of a cooling conduit.

Referring to FIGS. 4, 5 and 6, which are front, side, and perspective views, respectively, of cooling conduit 142, conduit 142 includes an inlet end 154 and an outlet end 156. Enlarged tube sections 158 and 160 are located at ends 154 and 156 and align with inlet and outlet ports 110 and 112 in frame 102 (FIG. 1). An intermediate portion 162 of conduit 142 has a generally helical geometric shape. Spacer bars 152 engaged to conduit 142 provide support for conduit 142 and maintain the desired spacing between lengths, or turns, of conduit 142. Spacer bars 152 also facilitate centering conduit 142 within the cast frame wall and locating conduit 142 axially within the frame wall during the casting process. Spacer bars 152 also can be used determine the concentricity of cooling conduit 142 with respect to the stator frame bore prior to the machining process, which reduces the possibility of damaging conduit 142 during stator frame machining operations.

With respect to motor 100 (FIG. 1), and prior to operation, inlet and outlet ports 110 and 112 are coupled in a closed loop cooling circuit which includes, for example, a pump and a remote heat exchanger. Alternatively, an open loop cooling circuit could be used. In operation, a cooling medium such as water flows through the cooling circuit. Particularly, to cool motor 100 during operation, the cooling medium is delivered to inlet port 110 and flows through conduit 142 to outlet port 112. As the cooling medium flows through conduit 142, heat generated by motor 100 is transferred to the medium through conduit 142. The heated cooling medium then flows out of frame 102 through outlet port 112, and the heated cooling medium is then pumped by the cooling circuit. The pumped cooling medium is circulated through a remote heat exchanger and returned to inlet port 110.

Motor 100 including stator frame 102 with cast in place cooling conduit 142 has the advantages of a liquid cooled motor yet is believed to be lower cost than known liquid cooled motors. Such lower cost is achieved by providing that preformed cooling conduit 142 is simply cast in place rather than requiring the significant machining, welding, and assembly time associated with known water jackets. Also, the material used in casting frame 102 can be selected to further reduce machining costs.

In addition, motor 100 is believed to be less susceptible to corrosion and liquid leaks as compared to known liquid cooled motors. Specifically, since cooling conduit 142 is cast in place in frame 102, the possibility for leaks and internal corrosion are believed to be reduced as compared the possibility for leaks and corrosion which may result with known water jackets. The cooling conduit material may also be selected to provide optimum corrosion resistance independent of the frame wall material. For example, the cooling conduit material may be stainless steel and the frame material may be gray iron.

Cooling conduit 142 provides that the cooling medium flows around, or circumferentially, with respect the motor stator. Of course, the cast in place cooling conduit is not limited to the exemplary helical configuration shown in the drawings discussed above. The cooling conduit can have many alternative geometric configurations.

For example, FIG. 7 is a perspective view of an alternative embodiment of a cooling conduit 200 having a squirrel cage configuration. Although shown by itself in FIG. 7, it should be understood that conduit 200 would be cast in place in a motor frame. Opposing ends 202 and 204 of conduit 200 include tube rings 206 and 208 having a generally circular shape, and straight tube segments 210 are coupled to and extend between rings 206 and 208. Each tube segment 210 is in flow communication with each ring 206 and 208. Tube rings 206 and 208 and tube segments 210 form the squirrel cage configuration of conduit 200. Inlet and outlet tubes 212 and 214 are coupled to one of respective rings 206 and 208. Enlarged tube sections 216 and 218 are located at the ends of tubes 212 and 214 and align with, for example, inlet and outlet ports 110 and 112 of frame 102 (FIG. 1). Spacer bars 220 are engaged at opposing ends 202 and 204 to respective rings 206 and 208 to provide support and extra rigidity for conduit 200. Spacer bars 220 also facilitate centering conduit 200 within the cast frame wall and locating conduit 200 axially within the frame wall during the casting process. Spacer bars 220 also can be used determine the concentricity of cooling conduit 200 with respect to the stator frame bore prior to the machining process, which reduces the possibility of damaging conduit 200 during stator frame machining operations.

With squirrel cage conduit 200, and prior to operation, inlet and outlet tubes 212 and 214 are coupled in a cooling circuit which includes, for example, a pump. In operation, a cooling medium such as water flows through the cooling circuit. The heated cooling medium from the motor is pumped through a remote heat exchanger, and is returned to inlet tube 212.

Figure 8:
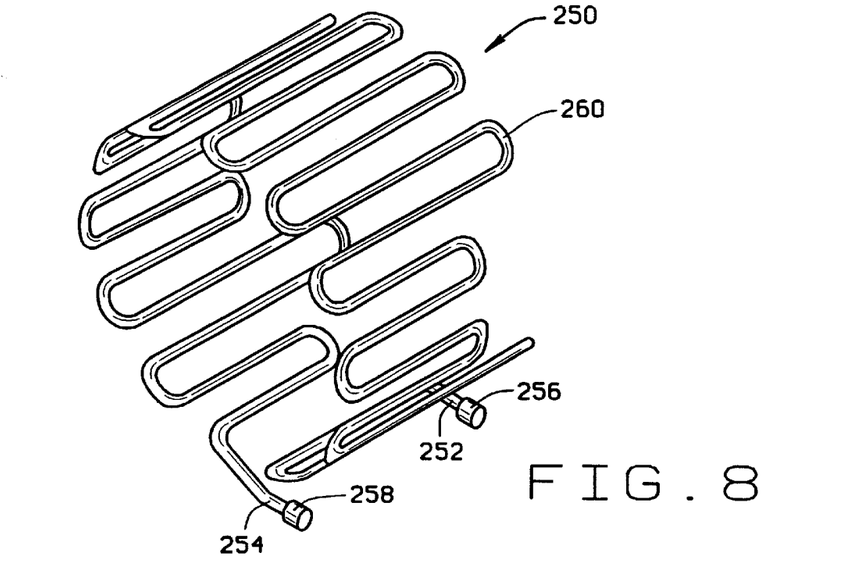
FIG. 8 is a perspective view of yet another alternative embodiment of a cooling conduit.

FIG. 8 is a perspective view of yet another alternative embodiment of a cooling conduit 250. Although shown by itself in FIG. 8, it should be understood that conduit 250 would be cast in place in a motor frame. Rather than a circumferential flow pattern as provided with cooling conduit 142 (FIG. 6), water flows through conduit 250 in an axial flow pattern. Particularly, conduit 250 includes an inlet end 252 and an outlet end 254. Enlarged tube sections 256 and 258 are located at ends 252 and 254 and align with inlet and outlet ports 110 and 112 of frame 102 (FIG. 1). An intermediate portion 260 of conduit 250 has a generally serpentine geometric shape. Spacer bars (not shown) may be engaged to conduit 250 to provide support for conduit 250 and maintain the desired spacing between lengths, or turns, of conduit 250. The spacer bars also facilitate centering conduit 250 within the cast frame wall and locating conduit 250 axially within the frame wall during the casting process. The spacer bars also can be used determine the concentricity of cooling conduit 250 with respect to the stator frame bore prior to the machining process, which reduces the possibility of damaging conduit 250 during stator frame machining operations.

Prior to operation, inlet and outlet ends 252 and 254 are coupled in a cooling circuit which includes, for example, a pump and remote heat exchanger. In operation, the cooling medium is delivered to inlet end 252 and flows through conduit 250 to outlet end 254. As the cooling medium flows through conduit 250, heat is transferred to the medium through conduit 250. The heated cooling medium is then pumped by the cooling circuit pump through the remote heat exchanger, and the cooling medium is returned to inlet end 252.

While exemplary embodiments of the cooling conduit have been described above, it is contemplated that the cooling conduit can have many other configurations. Therefore, it should be understood that the present invention is not limited to any particular geometric configuration of the cooling conduit.

Further, it is contemplated that cooling conduit can be totally eliminated by casting the stator frame to include a cooling passageway defined by the walls of the stator frame. Such a cooling passageway can be formed, for example, by including mold tooling defining an internal passageway through the stator frame.

Figure 9:
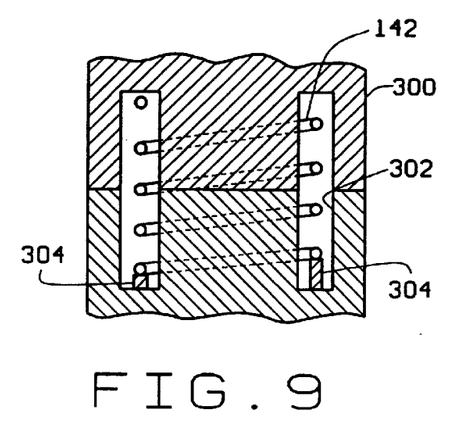
FIG. 9 is a partial cross-section view through mold tooling utilized to cast the stator frame integrally with the cooling tube conduit shown in FIG. 6.

With respect to fabrication of stator frame 102 (FIG. 1), FIG. 9 is a partial cross-section view through mold tooling 300 utilized in casting stator frame 102 around, and integrally with, cooling tube conduit 142. Prior to the casting operation, cooling conduit 142 is formed into the helical configuration from materials suitable for use as a cooling coil and suitable for use with the casting process, such as stainless steel.

Conduit 142 may be filled with sand to prevent collapsing during the casting process. Conduit 142 typically is cleaned and pre-treated with a flux material to ensure adhesion of the cast metal to conduit 142 during the metal solidification process.

As is well known, mold tooling 300 can be fabricated using sand casting techniques. Preformed conduit 142 is positioned within a mold tooling cavity 302, and positioners 304 are utilized to position conduit 142 within cavity 302. Positioners 304 are integral with mold tooling 300. Alternatively, positioners 304 can be fabricated from metal, ceramic, or foam and adhesively secured to mold tooling 300.

Once conduit 142 is positioned within mold tooling 300 as shown in FIG. 9, frame 102 is cast around conduit 142 using a metal casting process. Alternatively, frame 102 can be cast from gray iron, ductile iron, steel, or a metal alloy. Metal casting processes are well known.

Once the molten metal cools, the frame and conduit assembly is removed from mold tooling 300, and cleaned and inspected to ensure integrity has been maintained. In addition, if sand has been placed within conduit 142, the sand is blown out of conduit.

The stator frame fabrication process described above is believed to be much more simple and lower cost in terms of both material and labor than known processes for fabrication of known water jackets. In addition, and as explained above, since conduit 142 is molded or cast integral with frame 102, the above described stator frame and conduit assembly is believed to be less susceptible to leakage and corrosion than the known constructions. Also, the materials for the stator frame walls and for the conduit may be selected separately, or substantially independently, to achieve best cost and performance for the particular motor.

Figure 10:
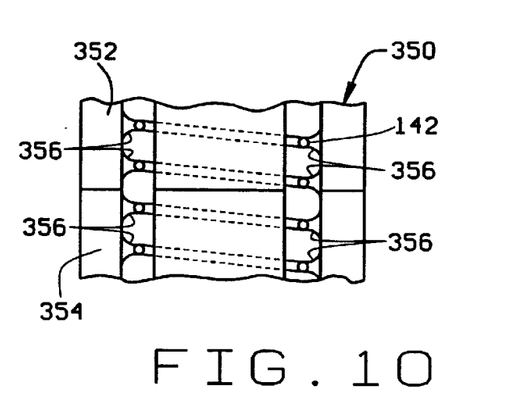
FIG. 10 is a partial cross-section view through mold tooling utilized to cast foam integrally with the cooling tube conduit shown in FIG. 6 in connection with performing a lost foam fabrication method.

Of course, other processes can be used to fabricate the stator frame and cooling conduit assembly. For example, a lost foam casting process can be used. Particularly, FIG. 10 is a partial cross-section view through mold tooling 350 utilized to cast foam around cooling conduit 142. Cooling conduit 142 is formed into the helical configuration prior to the casting operation. Conduit 142 may be filled with sand to prevent collapsing during the casting process. Conduit 142 is cleaned and pre-treated with a flux material to ensure adhesion of the cast metal to conduit 142 during the metal solidification process.

Mold tooling 350 includes an upper mold tool 352 and a lower mold tool 354. Mold tooling 350 can be fabricated using well known techniques, and includes integral positioning fingers 356.

Figure 11:
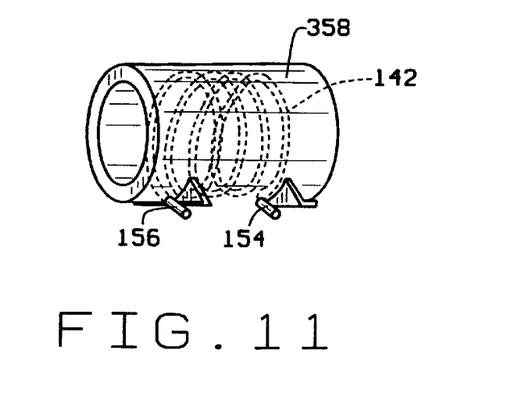
FIG. 11 is a perspective view of a cooling conduit embedded in foam as result of the operation performed utilizing the tooling shown in FIG. 10.

Once conduit 142 is positioned within mold tooling 350 as shown in FIG. 10, foam is then injected into mold tooling 350 and solidifies around conduit 142 to form a rigid foam structure 358 (FIG. 11). Rigid foam structure 358 is then removed from mold tooling 350. An exemplary embodiment of such rigid foam structure 358 is illustrated in FIG. 11.

After structure 358 is removed from mold tooling 350, foam structure 358 is then positioned within metal casting tooling, and frame 102 is cast around conduit 142. As is well known, foam vaporizes during the metal casting process.

The mold tooling required for the lost foam casting process is believed to be more expensive than the tooling required in the process described in connection with FIG. 9. However, the lost foam casting process is believed to be much more simple and lower cost in terms of both material and labor than known processes for fabrication of steel frames and water jackets. In addition, the lost foam process may result in frames of more consistent quality, or repeatability, than other casting processes.

From the preceding description of several embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the inventions are to be limited only by the terms of the appended claims.

What is claimed is:

1. A stator frame for an electric motor, said stator frame comprising:

a substantially cylindrical shaped body section having opposed ends, and a cooling passageway extending through at least a portion of said body section, said cooling passageway comprises a cooling conduit;

an inlet port and an outlet port in flow communication with said cooling passageway; and at least one spacer bar engaged to said cooling conduit.

2. A stator frame in accordance with claim 1 wherein said body section comprises a wall having an outer surface and an inner surface, and said cooling passageway is at least partially within said wall between said inner surface and said outer surface.

3. A stator frame in accordance with claim 1 wherein said cooling conduit comprises an inlet end positioned at said inlet port and an outlet end positioned at said outlet port.

4. A stator frame in accordance with claim 3 wherein said cooling conduit further comprises an intermediate portion between said inlet end and said outlet end.

5. A stator frame in accordance with claim 4 wherein said cooling conduit intermediate portion is arranged in a generally helical geometric configuration.

6. A stator frame in accordance with claim 4 wherein said cooling conduit intermediate portion is arranged in a generally serpentine geometric configuration.

7. A stator frame for an electric motor, said stator frame comprising:

a substantially cylindrical shaped body section having opposed ends, and a cooling passageway extending through at least a portion of said body section, said cooling passageway comprises a cooling conduit comprising an inlet end and an outlet end, said cooling conduit further comprising first and second tube rings having a generally circular shape, and a plurality of straight tube segments coupled to and extending between said first and second rings; and an inlet port and an outlet port in flow communication with said cooling passageway, said inlet end positioned at said inlet port and said outlet end positioned at said outlet port.

8. A stator frame in accordance with claim 7 wherein an inlet tube is coupled to said first ring and an outlet tube is coupled to said second ring.

9. A stator frame in accordance with claim 3 wherein said cooling conduit is a first material and said body section is a second material.

10. An electric motor, comprising:

a stator frame comprising a substantially cylindrical shaped body section having opposed first and second ends, and a cooling passageway extending through at least a portion of said body section, said frame further comprising an inlet port and an outlet port in flow communication with said cooling passageway, said cooling passageway comprises a cooling conduit;

a first end shield secured to said first stator frame end;

a second end shield secured to said second stator frame end; and at least one spacer bar engaged to said cooling conduit.

11. An electric motor in accordance with claim 10 wherein said stator frame further comprises a plurality of support feet and lifting lugs extending from said body section.

12. An electric motor in accordance with claim 10 wherein said stator frame body section comprises a wall having an outer surface and an inner surface, and said cooling passageway is at least partially within said wall between said inner surface and said outer surface.

13. An electric motor in accordance with claim 10 wherein said cooling conduit comprises an inlet end positioned at said inlet port and an outlet end positioned at said outlet port.

14. An electric motor in accordance with claim 13 wherein said cooling conduit further comprises an intermediate portion between said inlet end and said outlet end.

15. A stator frame in accordance with claim 14 wherein said cooling conduit intermediate portion is arranged in a generally helical geometric configuration.

16. A stator frame in accordance with claim 14 wherein said cooling conduit intermediate portion is arranged in a generally serpentine geometric configuration.

17. An electric motor, comprising:

a stator frame comprising a substantially cylindrical shaped body section having opposed first and second ends, and a cooling passageway extending through at least a portion of said body section, said frame further comprising an inlet port and an outlet port in flow communication with said cooling passageway, said cooling passageway comprises a cooling conduit comprising first and second tube rings having a generally circular shape, and a plurality of straight tube segments coupled to and extending between said first and second rings;

a first end shield secured to said first stator frame end; and a second end shield secured to said second stator frame end.

18. A stator frame in accordance with claim 17 wherein an inlet tube is coupled to said first ring and an outlet tube is coupled to said second ring.

19. A stator frame in accordance with claim 13 wherein said cooling conduit is a first material and said body section is a second material.

20. A method for fabricating a stator frame, said method comprising the steps of:

arranging a cooling conduit into a selected configuration;

engaging at least one spacer bar to the cooling conduit; and casting the stator frame so that the cooling conduit is at least partially embedded within the frame.

21. A method in accordance with claim 20 wherein the selected configuration for the cooling conduit is a generally helical geometric configuration.

22. A method in accordance with claim 20 wherein the selected configuration for the cooling conduit is a generally serpentine geometric configuration.

23. A method in accordance with claim 20 wherein the selected configuration is a squirrel cage configuration.

24. A method in accordance with claim 20 wherein casting the stator frame so that the cooling conduit is at least partially embedded within the frame comprises the steps of:

positioning the conduit within metal casting tooling; and injecting molten metal into the tooling and around the conduit.

25. A method in accordance with claim 24 wherein prior to positioning the conduit within the metal casting tooling, said method comprises the step of at least partially embedding the conduit in a rigid foam structure.

26. A method in accordance with claim 20 wherein the cooling conduit is a first material and the casting material is a second material.

27. A stator frame for an electric motor, said stator frame comprising:

a substantially cylindrical shaped body section comprising opposed ends, a cooling passageway extending through at least a portion of said body section, and a wall having an outer surface and an inner surface, said cooling passageway comprises a cooling conduit partially within said wall between said inner surface and said outer surface; and an inlet port and an outlet port in flow communication with said cooling passageway.

28. A stator frame in accordance with claim 27 wherein said cooling conduit comprises an inlet end positioned at said inlet port and an outlet end positioned at said outlet port.

29. A stator frame in accordance with claim 27 wherein said cooling conduit further comprises an intermediate portion arranged in a generally helical geometric configuration.

30. A stator frame in accordance with claim 27 wherein said cooling conduit is a first material and said body portion is a second material.

31. A stator frame in accordance with claim 27 further comprising at least one spacer bar engaged to said cooling conduit.

\* \* \* \* \*